US006386823B1

(12) United States Patent
    Perreault

(10) Patent No.: US 6,386,823 B1
(45) Date of Patent: May 14, 2002

(54) MACHINE FOR CONVEYING LUMBER OR LOGS OF WOOD

(76) Inventor: René Perreault, 22 Principale, La Reine, Abitibi Quest, Québec (CA), J0Z 2L0

( * ) Notice: Subject to any disclaimer, the term of this patent is extended or adjusted under 35 U.S.C. 154(b) by 0 days.

(21) Appl. No.: 09/512,528

(22) Filed: Feb. 24, 2000

(30) Foreign Application Priority Data

Feb. 25, 1999 (CA) .............................................. 2262076

(51) Int. Cl.$^7$ ............................................... B66F 11/00
(52) U.S. Cl. ................................ 414/745.9; 414/745.7; 198/608
(58) Field of Search ................................ 225/237, 266; 198/608, 443, 459.5, 463.5; 414/745.7, 745.9

(56) References Cited

U.S. PATENT DOCUMENTS

| 1,779,683 | A |   | 10/1930 | Strandt et al. |
| 2,993,606 | A | * | 7/1961  | Helstrom ................. 414/745.9 |
| 3,157,071 | A | * | 11/1964 | Pachell ....................... 198/608 |
| 4,326,623 | A | * | 4/1982  | Zacharias et al. ........... 198/608 |
| 4,361,223 | A | * | 11/1982 | Johnson .................... 414/745.9 |
| 5,061,380 | A | * | 10/1991 | Stevenson .................. 198/608 |
| 5,062,523 | A | * | 11/1991 | Lenz .......................... 198/608 |

FOREIGN PATENT DOCUMENTS

DE            20 02 360 B2 *   7/1971 ................. 198/608

* cited by examiner

Primary Examiner—H. Grant Skaggs
(74) Attorney, Agent, or Firm—Myers Bigel Sibley & Sajovec, P.A.

(57) ABSTRACT

A machine is disclosed for conveying wooden piece such as logs of wood and lumber, in wood transformation industries such as sawmills. The wooden pieces are conveyed in a conveying direction from the front towards the back of the frame of the machine. The machine has several conveying shafts rotatably mounted in parallel on the sides of the frame. Each shaft has a rotating axis about which it is driven in rotation in a direction corresponding to the conveying direction. Several toothed circular plates are mounted on each shaft and extend in a plane crossing the axis of rotation of the shafts. The plates of a shaft are designed to be offset with respect to the plates of an adjacent shaft. Each tooth of each plate are spaced apart from an adjacent tooth by a distance which corresponds substantially to the range of diameter of the wooden pieces and defines a space therebetween for receiving at least a portion of a wooden piece. The teeth of the plates mounted on a same shaft disposed in order to be aligned together. In action, the rotation of the conveying shafts are synchronised together in such a way that a wooden piece inserted between two teeth of the conveying plates of a shaft is conveyed in the direction of rotation of this shaft until a tooth of the plates of an adjacent downstream shaft carries the wooden piece. So the wooden piece is transferred to the adjacent shaft and is engaged and carried between two teeth of the plates of the adjacent shaft. Therefore, the adjacent downstream shaft conveys the wooden piece further with respect to the conveying direction. The machine can be designed in order to convey the wooden pieces horizontally or upwardly.

13 Claims, 14 Drawing Sheets

MACHINE FOR CONVEYING LUMBER OR LOGS OF WOOD

FIELD OF THE INVENTION

The present invention relates to a machine for conveying lumber or logs of wood in wood transformation industries such as sawmills.

BACKGROUND

In sawmills, lumber and logs of wood need to be conveyed between various stations, some of which are at different levels, implying that the lumber and logs must be lifted from one level to another.

Different types of apparatuses for conveying the logs of wood, whether or not the bark is still present on the log, exist. These apparatuses are also used for dropping the logs of wood one by one on a strap conveyor directed perpendicularly to the conveying direction of the apparatus, in such a way that the logs of wood are positioned end-to-end thereon for feeding a wood transformation machine.

One known type of apparatus for conveying logs of wood comprises an inclined panel, on which are operatively mounted several driving belts, which are positioned laterally. The driving belts have protruding lugs all along their length that are designed and positioned in such a way that a log of wood may be carried on a set of aligned lugs and conveyed upwardly by the motion of the driving belts.

One type of apparatus for conveying lumber is known and used in sawmills, and functions similarly to one of the known types of apparatus for conveying logs of wood previously described. This type of apparatus for conveying lumber may carry one or more pieces of lumber at the same time. At the exit, the lumber is transferred on a strap conveyor directed in parallel to the conveying direction of the apparatus and the pieces of lumber are accumulated side-by-side on the strap conveyor.

Another known type of apparatus for conveying logs of wood is called the "step-feeder". U.S. Pat. Nos. 5,374,157, 3,168,190 and 5,678,681 disclose different apparatuses of the "step-feeder" type.

The apparatuses described in U.S. Pat. Nos. 3,168,190 and 5,678,681 have one large staircase with several stairs moving independently, in such a way that two adjacent stairs move up and down oppositely alternately. It results that when a log is carried by one stair moving upwardly, it is transferred to the following stair which just moved downwardly in order to pick up the log and move upwardly to transfer the log to the next upstream stair, and so on.

The apparatus described in U.S. Pat. No. 5,374,157 uses the same principle as the one described in U.S. Pat. Nos. 3,168,190 and 5,678,681, but it uses several staircase-like-structures placed side-by-side. Alternately, each staircase-like-structure moves independently up and down by a predetermined distance. They are divided into two sets: a first set, and a second set being intercalate between the staircase-like-structures of the first set. When the first set of staircase-like-structures moves down, the second set of staircase-like-structures moves up. These movements define an arc of a circle respectively. In operation, a log of wood is carried upwardly by the aligned stairs of one set of staircase-like-structures, while the second set of staircase-like-structures moves down until an aligned stair of this second set picks up the log of wood and carries it upwardly until an upstream aligned stair of the first set of staircase-like-structures picks up the log of wood and moves it upwardly, and so on.

The above-described apparatuses for conveying lumber or logs of wood have many drawbacks. One drawback of these apparatuses is their complex mechanics, which break frequently. The constitutive pieces are subject to wear, and the apparatuses require constant maintenance.

Another drawback is the fact that these apparatuses for conveying lumber or logs are generally noisy. Having less noise means a better working environment and possibly less injuries to the workers due to disturbance.

In the case of the known apparatuses for conveying logs of wood, a further drawback consists in the fact that there exists the possibility of having two logs of wood carried by the apparatus at the same time, which results in transferring two logs side-by-side on the strap conveyor. This is inconvenient since it is necessary to have the logs aligned end-to-end to avoid obstruction of the transformation machine fed by the strap conveyor. The possibility of two logs being carried at the same time is frequently caused by a curved log or a log that still has bark, which rolls to a downstream step and is conveyed together with the downstream log.

Still in the case of the known apparatuses for conveying logs of wood, an additional drawback is their inability to convey the logs of wood at a high speed. Some of the apparatus known in the field cannot convey the logs at a speed higher 55 logs per minute. The fact that a curved log or a log with bark rolls down one step or more in some of the known apparatus, represents an additional factor which slows down the conveying speed.

SUMMARY OF THE INVENTION

The present invention is directed to a machine that overcomes one or more of the above-mentioned drawbacks.

In accordance with the present invention, there is provided a machine for conveying elongated wooden pieces. Each wooden piece has a width falling within a given range. The machine comprises:

- a frame having two opposite sides, a front and a back, the wooden pieces being conveyed in a conveying direction from the front towards the back of the frame;
- at least two parallel conveying shafts rotatably mounted on the frame, and being substantially perpendicular to the conveying direction, each shaft having an axis of rotation;
- rotating means for rotating each shaft about said axis of rotation at a desired speed in a direction corresponding to the conveying direction; and
- at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the wooden pieces and defining a space therebetween for receiving at least a portion of a wooden piece, the teeth of the plates mounted on a same shaft being aligned;
- wherein each shaft is spaced from an adjacent shaft by a distance at least equal to the radius of a toothed plate.

In accordance with the present invention, there is also provided a machine for conveying logs of wood. Each log of wood has a width falling within a given range. The machine comprises:

- a frame having two opposite sides, a front and a back, the logs being conveyed in a conveying direction from the front towards the back of the frame;

at least two parallel conveying shafts rotatably mounted on the frame, and being substantially perpendicular to the conveying direction, each shaft having an axis of rotation;

rotating means for rotating each shaft about said axis of rotation at a desired speed in a direction corresponding to the conveying direction; and at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the logs and defining a space therebetween for receiving at least a portion of a log, the teeth of the plates mounted on a same shaft being aligned;

wherein each shaft is spaced from an adjacent shaft by a distance at least equal to the radius of a toothed plate.

In accordance with the present invention, there is further provided a machine for conveying lumber. Each lumber has a width falling within a given range. The machine comprises:

a frame having two opposite sides, a front and a back, the lumber being conveyed in a conveying direction from the front towards the back of the frame;

at least two parallel conveying shafts rotatably mounted on the frame, and being substantially perpendicular to the conveying direction, each shaft having an axis of rotation;

rotating means for rotating each shaft about said axis of rotation at a desired speed in a direction corresponding to the conveying direction; and at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the lumber and defining a space therebetween for receiving at least a portion of a lumber, the teeth of the plates mounted on a same shaft being aligned;

wherein each shaft is spaced from an adjacent shaft by a distance at least equal to the radius of a toothed plate.

In accordance with the present invention, there is also further provided a machine for separating and conveying logs of wood where each log has a diameter falling within a given range and the machine comprises:

a frame having two opposite sides, a front and a back, the logs of wood being conveyed in a conveying direction from the front towards the back of the frame;

at least three parallel conveying shafts rotatably mounted on the frame, and being substantially perpendicular to the conveying direction, each conveying shaft having an axis of rotation, all the shafts extending in an inclined plane so that the back of the frame is higher than the front of the frame and the conveying direction is oriented upwardly rotating means for rotating each shaft about its axis of rotation at a desired speed in a direction corresponding to the conveying direction;

at least two notched circular plates mounted on a most upstream shaft, each notched plate having a circumference being provided with a plurality of thin notches;

at least two toothed circular plates mounted on each shaft being downstream from the most upstream shaft, each tooth being spaced apart from an adjacent tooth by a distance which corresponds substantially to the range of diameter of the logs of wood, and defining a space therebetween for receiving at least a portion of a log, the teeth of the plates mounted on a same shaft being aligned;

a shelf on the front of the frame for receiving a bundle of logs of wood; and two side walls mounted on each opposite side of the frame and extending upwardly, the walls defining with the shelf a separating and conveying area;

wherein each of the toothed plates and the notched plates has a radius and extends in a plane crossing to the axis of rotation of the shaft on which it is mounted, the plates of a shaft being offset with respect to the plates of an adjacent shaft; and wherein each shaft is spaced from an adjacent shaft by a distance at least equal to the radius of a toothed plate or the radius of a notched plates.

The invention and its advantages will be better understood upon reading the non restrictive description of the preferred embodiments of the present invention. This description is given with reference to the appended drawings.

DETAILED DESCRIPTION OF THE PREFERRED EMBODIMENTS

The present invention, as mentioned above, concerns a machine (10) for conveying elongated wooden pieces (1) from one level to another. It is to be understood that a wooden piece (1) includes a log of wood (as illustrated in FIGS. 1, 5, 9, 10a, 10b and 10c) or a lumber (as illustrated in FIG. 11). The log of wood can be with or without bark. The lumber to be conveyed by the machine (10) of the present invention preferably have a transversal cross-section of 2×4 inches, 2×3 inches, 2×6 inches, 2×8 inches, 1×3 inches, 1×4 inches. However, as will be explained hereinafter, the machine (10) can be adapted for other sizes. The lumber can be of various lengths but usually the lumber is 8 or 16 feet long.

Figure 1:
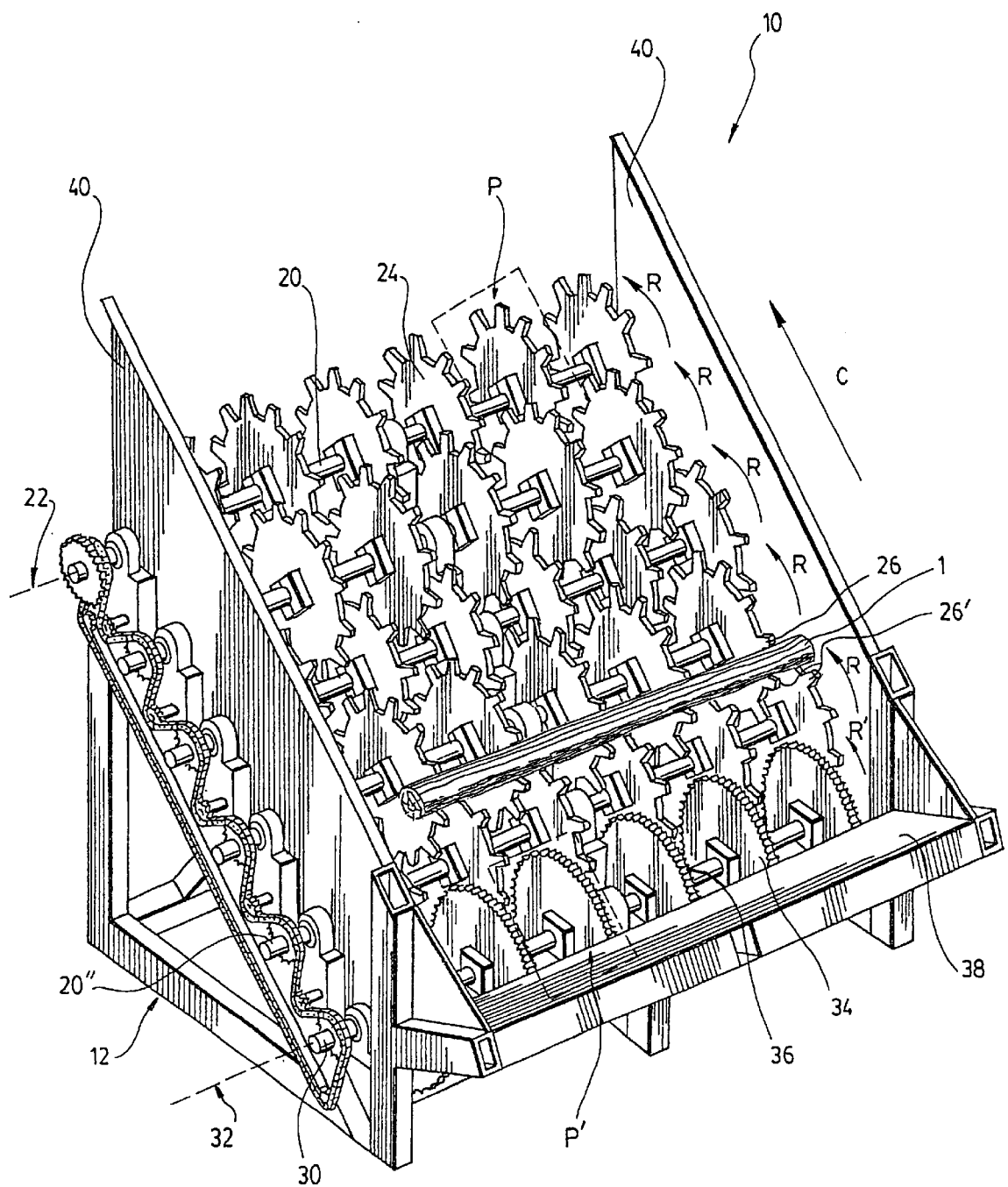
FIG. 1 is a perspective view of a first preferred embodiment of the invention.
Figure 2:
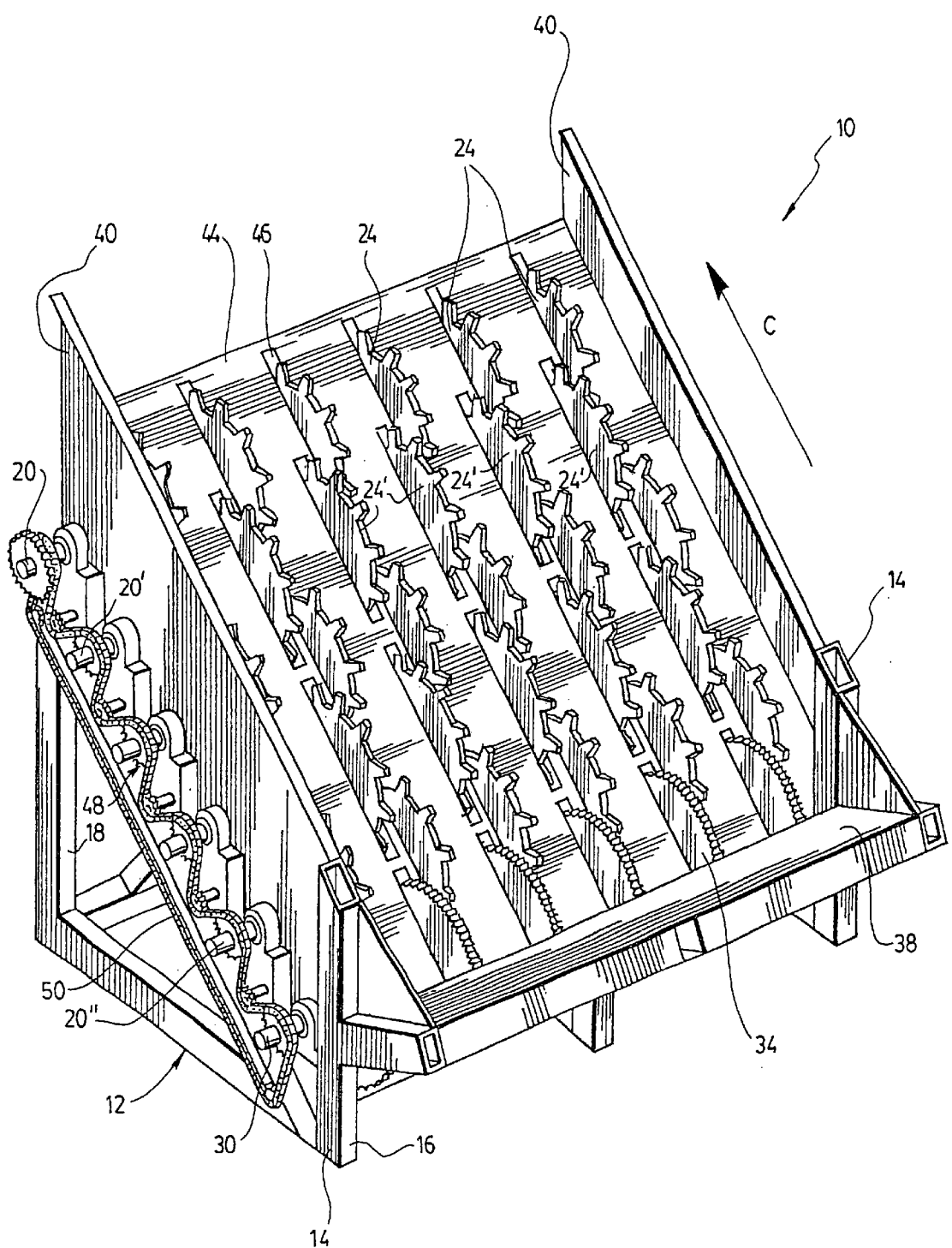
FIG. 2 is a perspective view of a second preferred embodiment of the invention.

Referring to FIG. 2, the machine (10) comprises a frame (12) having two opposite sides (14), a front (16) and a back (18). The wooden pieces (1) are conveyed in a conveying direction C from the front (16) towards the back (18) of the frame (12). The conveying direction C is illustrated in FIGS. 1, 2, 3, 6 and 7 by a wide arrow C.

Referring to FIG. 1, the machine (10) comprises at least two parallel conveying shafts (20) rotatably mounted on the frame (12), and being substantially perpendicular to the conveying direction C. Each shaft (20) has its own axis of rotation (22). As will be hereinafter described, a chain and pinion system is used to drive the shafts (20) in rotation, but any other means to do so, such as a cam, is contemplated by the present invention and is well within the skill of one versed in the art.

In the preferred embodiments of the invention shown in FIGS. 1 to 7, the conveying shafts (20) are substantially horizontal. However, it is to be understood that they can be inclined at an angle with respect to the horizontal, i.e. one extremity of the shafts (20) being mounted at a higher level on one side (14) of the frame (12) than the other side (14). If the angle is too large, the logs (1) could slide off the machine (10). In such a case, the side walls (40), which will be detailed hereinbelow, can prevent the wooden pieces (1) from sliding off, if necessary.

Still referring to FIG. 1, the machine (10) further comprises rotating means for rotating each shaft (20) about its axis of rotation (22) at a desired speed in a direction R corresponding to the conveying direction C. The direction of rotation R of the shaft (20) is illustrated by thin arrows R in FIG. 1. Rotating means can be different mechanisms such as hydraulic, air or mechanical mechanisms.

The machine (10) also comprises at least two toothed circular plates (24) mounted on each shaft (20). Each plate has a radius U (shown in FIG. 8A) and extends in a plane P crossing the axis of rotation (22) of the shafts (20) as shown in FIG. 1.

Figure 8A:
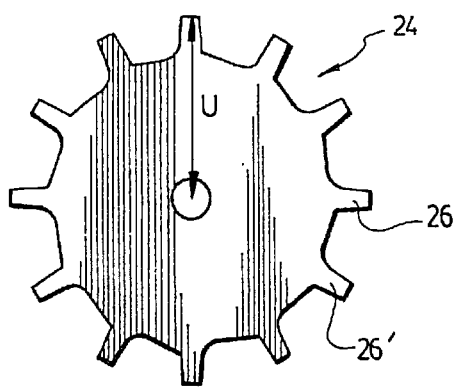
FIGS. 8A, B, C, D, E, F and G are views of seven different conveying plates.
Figure 8B:
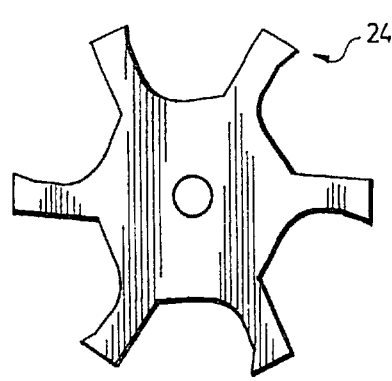
Figure 8C:
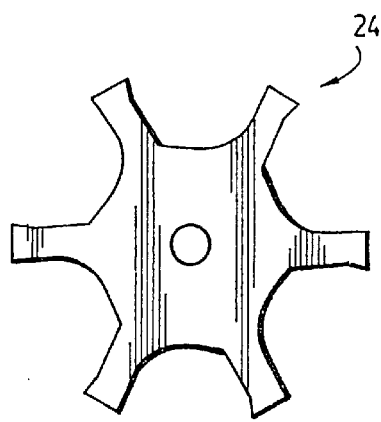
Figure 8D:
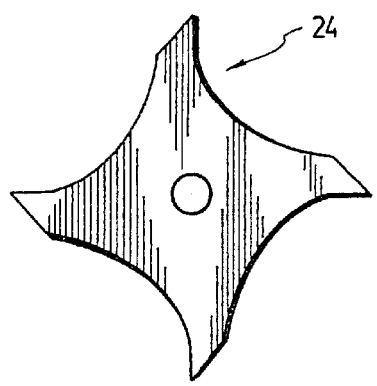

Different types of toothed plates are illustrated respectively in FIG. 8A, B, C, D, E, F and G and other shapes of plates (24) may be used according to the invention. Each tooth (26) of a toothed plate (24) has a shape that can be symmetrical or asymmetrical, and of different sizes. The plates (24) shown in FIGS. 8A, B, C, D and D are specifically adapted to convey logs of wood and the ones shown in FIGS. 8F and G are more specifically adapted to convey lumber. The tooth (26) of the plate (24) shown in FIG. 8F has preferably a height of 1 inch and a width of 5 inches. However, it is to be understood that the size of the teeth (26) can be chosen in order to optimize the conveying efficiency of the machine (10) with respect to the type of lumber to be conveyed (i.e. cross-sectional dimension).

As can be seen in FIG. 2, the plates (24) of a shaft (20) are offset with respect to the plates (24') of an adjacent shaft (20'). As illustrated in FIGS. 1 and 8A, each tooth (26) of each plate (24) is spaced apart from an adjacent tooth (26') by a distance which corresponds substantially to the range of diameter of the wooden pieces (1) and defining a space therebetween for receiving at least a portion of a wooden piece (1). It is to be understood that the wooden piece (1) can be completely or partially recessed between two adjacent teeth (26) of a plate (24) in order to be carried by the plate (24). The teeth (26) of the plates (24) mounted on a same shaft (20) are aligned together as shown in FIG. 1, so that a wooden piece (1) can be simultaneously recessed between two adjacent teeth (26) of the plates (24) of the same shaft (20).

Figure 3:
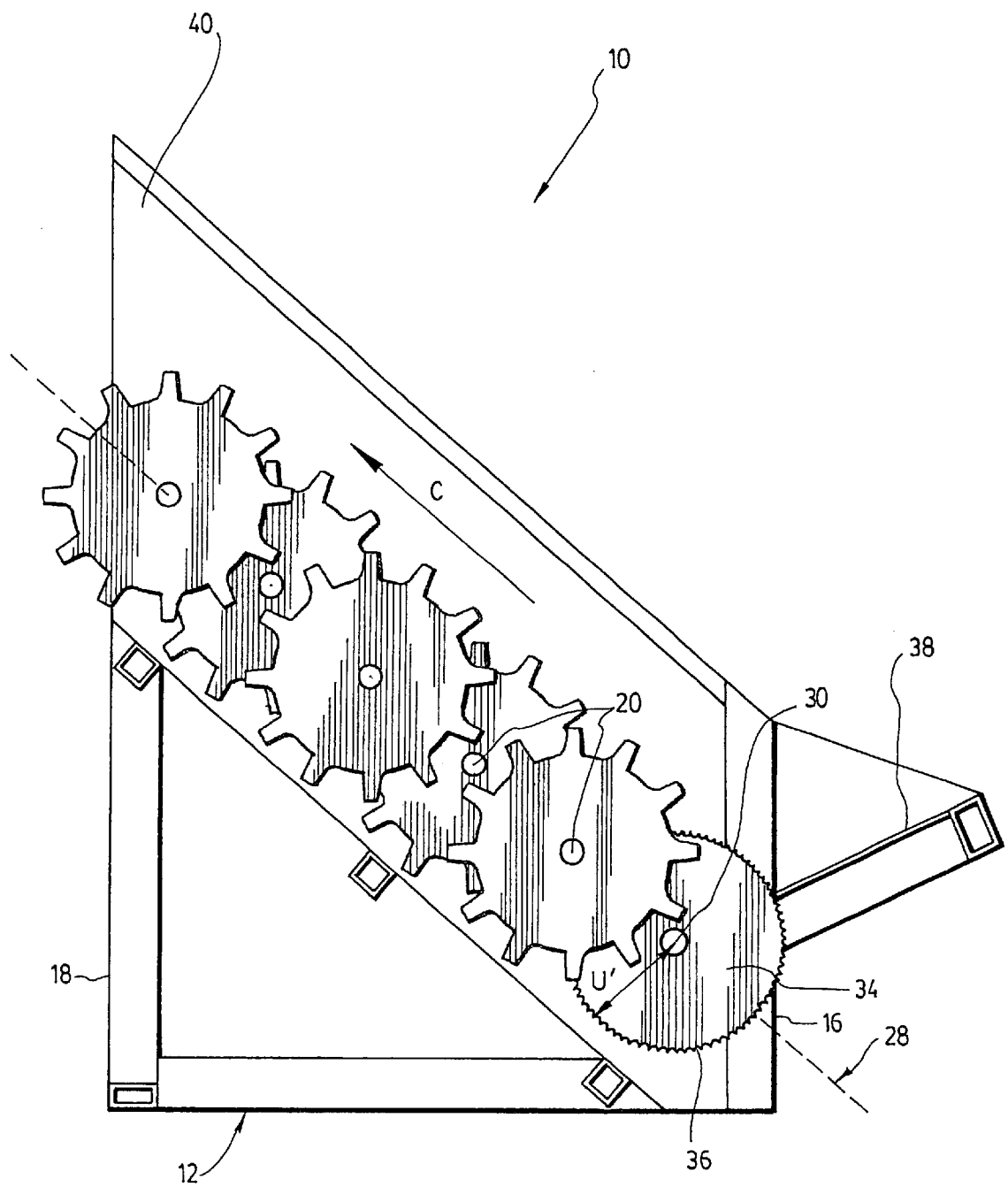
FIG. 3 is a cross-sectional view of the first preferred embodiment of the invention.
Figure 4:
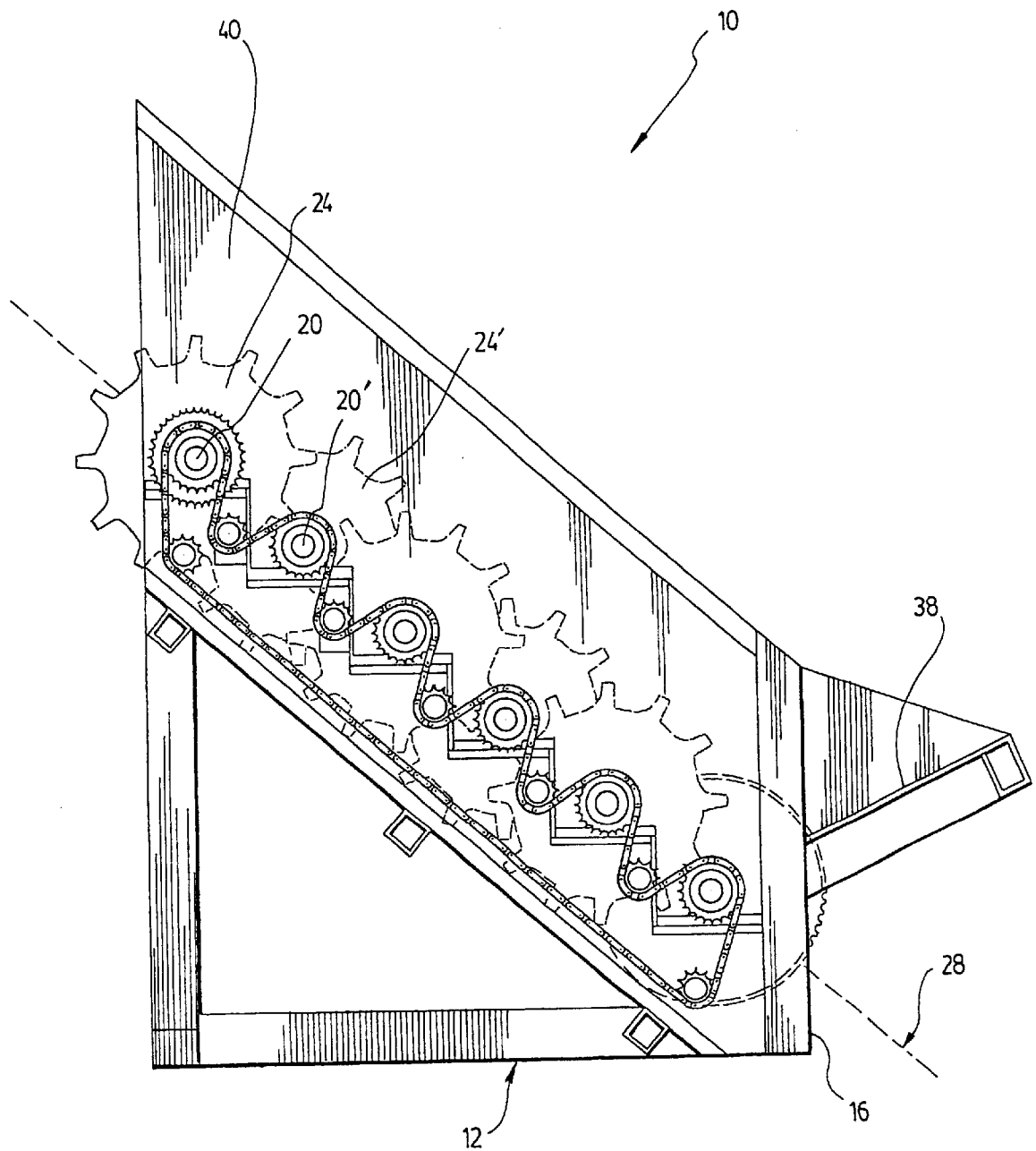
FIG. 4 is a side view of the first preferred embodiment of the invention.

As illustrated in the side views of FIGS. 3 to 7 and referring more particularly to the numbering on FIG. 4, each shaft (20) is spaced from an adjacent shaft (20') by a distance at least equal to the radius U (shown in FIG. 8A) of a toothed plate (24).

The rotation of the conveying shafts (20) is synchronised in such a way that a wooden piece (1) inserted between a guiding tooth (26) and a following tooth (26') of the conveying plates (24) of one shaft (20) is conveyed in the direction of rotation R of this shaft (20) until a following tooth (26') of the plates (24) of an adjacent downstream shaft (20) carries the wooden piece (1). Thus, the wooden pieces (1) is transferred to the adjacent shaft (20) and is now engaged and carried between the following tooth (26') and a guiding tooth (26) of the plates (24) of the adjacent downstream shaft (20). Therefore, the adjacent downstream shaft (20) conveys the wooden piece (1) further with respect to the conveying direction C.

Figure 6:
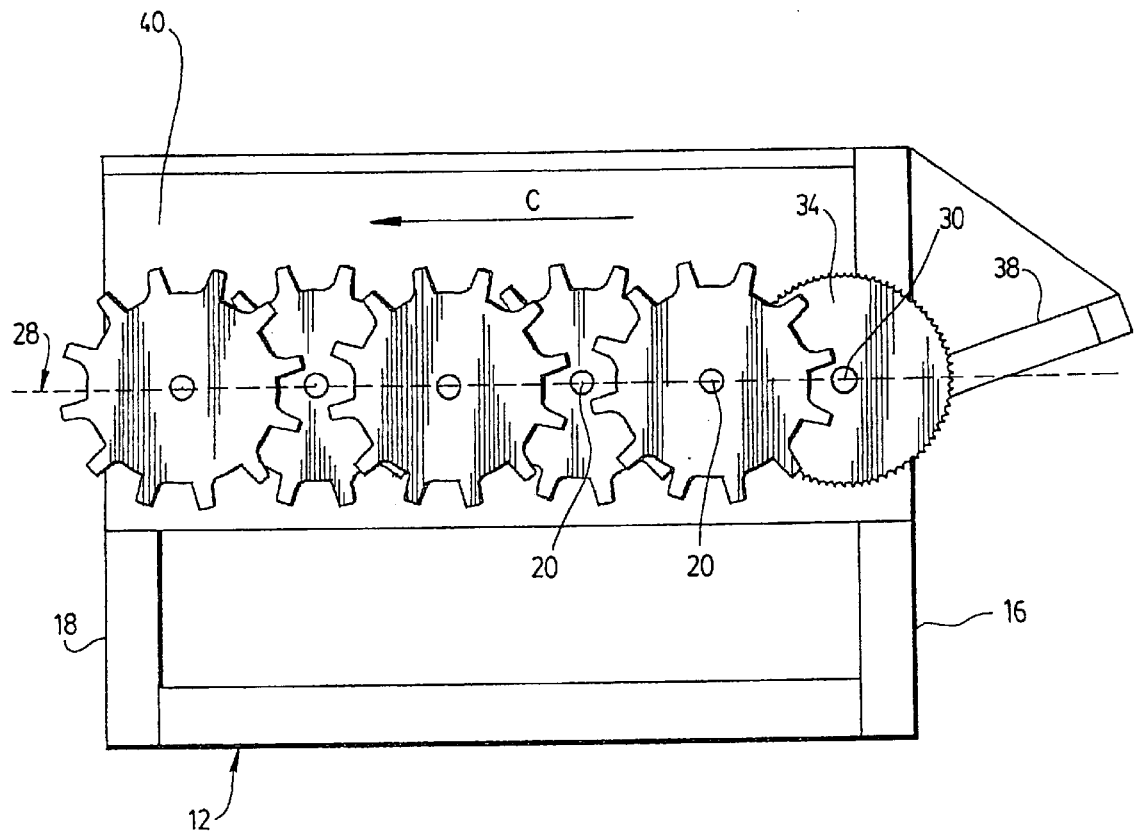
FIG. 6 is a cross-sectional view of a fourth preferred embodiment of the invention.

Referring more particularly to FIGS. 3 and 6, the machine (10) further comprises an additional shaft (30) which is rotatably mounted on the frame (12) and located upstream position of the at least two conveying shafts (20) of the machine (10) according to the invention. The two preferred embodiments of the machine (10) illustrated in FIGS. 3 and 6, comprise five conveying shafts (20) but, for the sake of clarity, only two are identified by a reference number. "Upstream" position refers to the conveying direction C; thus "upstream" is closer to the front (16) and "downstream" is closer to the back (18) of the machine (10).

Referring now to FIG. 1, the additional shaft (30) has an axis of rotation (32) which is parallel to the axis of rotation (22) of the conveying shafts (20). The machine (10) also comprises rotating means for rotating the additional shaft (30) about its axis of rotation (32) in a direction R' corresponding to the conveying direction C. Rotating means can be embodied in different mechanisms, as mentioned above with respect to the rotating means of the conveying shafts (20).

Referring to FIGS. 1 and 2, at least two notched circular plates (34) are mounted on the additional shaft (30) and in the preferred embodiments of the machine (10) illustrated in these figures, five notched plates (34) are mounted on the additional shaft (30). As indicated in FIG. 3, each notched plate (34) has a radius U' and a circumference being provided with a plurality of thin notches (36). As indicated in FIG. 1, each notched plate (34) extends in a plane P' crossing the axis of rotation (32) of the additional shaft (30). The notched plates (34) are offset with respect to the toothed plates (24) of a most upstream conveying shaft (20"). The additional shaft (30) is spaced from the most upstream conveying shaft (20") by a distance at least equal to the longest one of the radius U of a toothed plate (24) and the radius U' of a notched plate (34).

According to a preferred embodiment of the invention, each notched plate (34) of the additional shaft (30) has about 50 notches (36) and a radius U' longer than the radius U of each toothed plate (24) of the conveying shafts (20).

Figure 7:
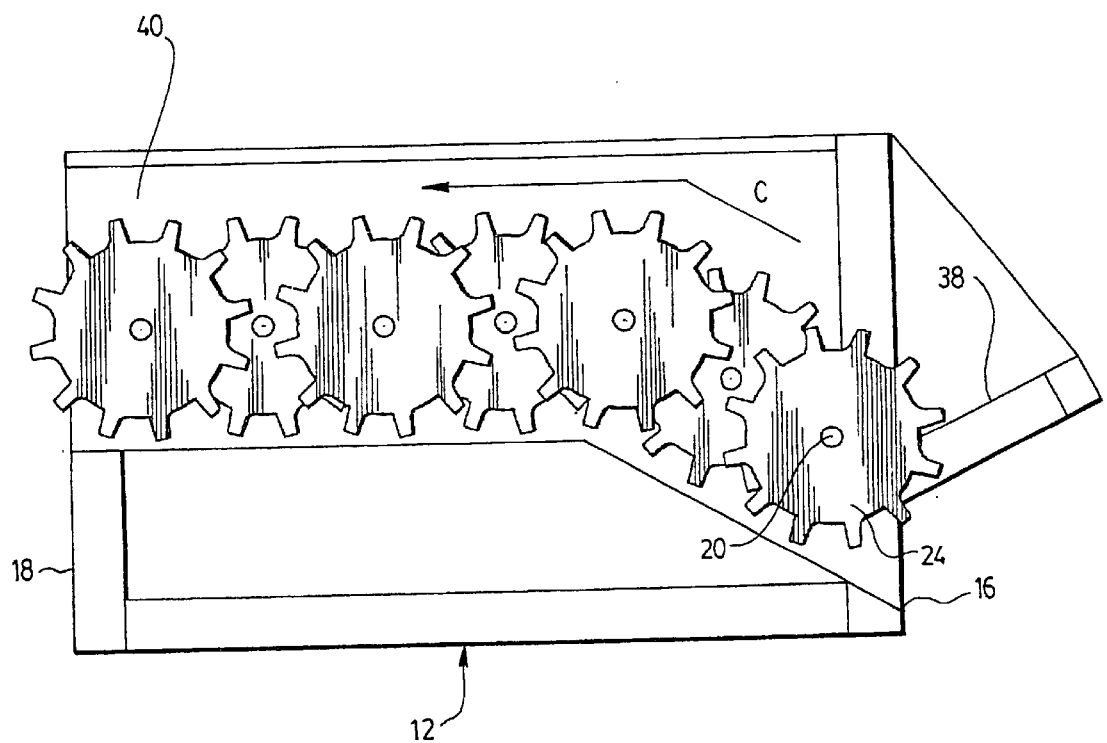
FIG. 7 is a cross-sectional view of a fifth preferred embodiment of the invention.

The presence of the additional shaft (30) and the notched plates (34) mounted thereon is a preferential feature of the machine (10) and is more particularly useful for a machine (10) being designed to convey logs of wood (1). This preferential feature is shown in the first, second, third, fourth and sixth preferred embodiments of the invention shown in FIGS. 1 to 6 and 9. The presence of the additional shaft (30) and the notched plates (34) makes the logs (1) rotate about themselves and helps to separate the logs (1) and engage them one by one between two adjacent teeth (26 and 26') of the toothed plates (24) of the upstream shaft (20). The additional shaft (30) is driven in rotation at a speed that can differ from the rotation speed of the conveying shafts (20). Increasing or reducing the speed of rotation of the additional shaft (30) helps to manage the accumulation of logs of wood (1) at the entry of the machine (10). FIG. 7 shows an alternative embodiment of the invention (namely the fifth preferred embodiment of the invention illustrated in the drawings) where the additional shaft (30) and the notched plates (34) are not included in the machine (10).

According to a preferred embodiment of the invention, each plane P in which each toothed plate (24) of the conveying shafts (20) extends, defines an angle with respect to the axis of rotation (22) of each conveying shaft (20) which is comprised between 75 and 90 degrees. In the preferred embodiments illustrated in FIGS. 1 and 2, the angle defined by the plane P and the axis (22) is 90 degrees.

As shown in FIGS. 1 to 7 and 9, the machine (10) preferably comprises a shelf (38) on the front (16) of the frame (12) for receiving and holding the wooden pieces (1). The shelf (38) is useful for holding a bunch of wooden pieces (1) in such a way that one or more wooden pieces (1) are in contact with the plates (24 or 34) of a most upstream shaft (20 or 30).

Referring to FIGS. 1 to 7 and 9, the machine (10) preferably comprises side walls (40) mounted on each opposite side (14) (indicated in FIG. 2) of the frame (12) and extending upwardly. The side walls (40) with the shelf (38) define a conveying area.

Preferably, all the conveying shafts (20), and the additional shaft (30) if this is the case, lie in a plane (28). This plane (28) can be horizontal or inclined so that the conveying direction C can be horizontally, upwardly or downwardly oriented. When the conveying direction C is horizontally or upwardly oriented, the plane defines an angle with the horizontal which is preferably comprised between 0 and 50 degrees, so that the back (18) of the frame is at a level equal to or higher than the front (16) of the frame (12). More preferably, the shafts (20 and 30) lie in a plane (28) defining an angle of 40 degrees with the horizontal. In the first preferred embodiment shown in FIGS. 3 and 4, the shafts (20 and 30) are aligned in an inclined plane (28) so that the conveying direction C is upwardly oriented, and in the fourth preferred embodiment shown in FIG. 6, the shafts (20 and 30) are aligned in a horizontal plane (28). However, it is to be understood that other layouts of the shafts (20 and 30) are possible according to the invention, and one example is given in FIG. 7 where the three first upstream shafts (20) lie in an inclined plane and the other downstream shafts (20) lie in horizontal plane.

Figure 5:
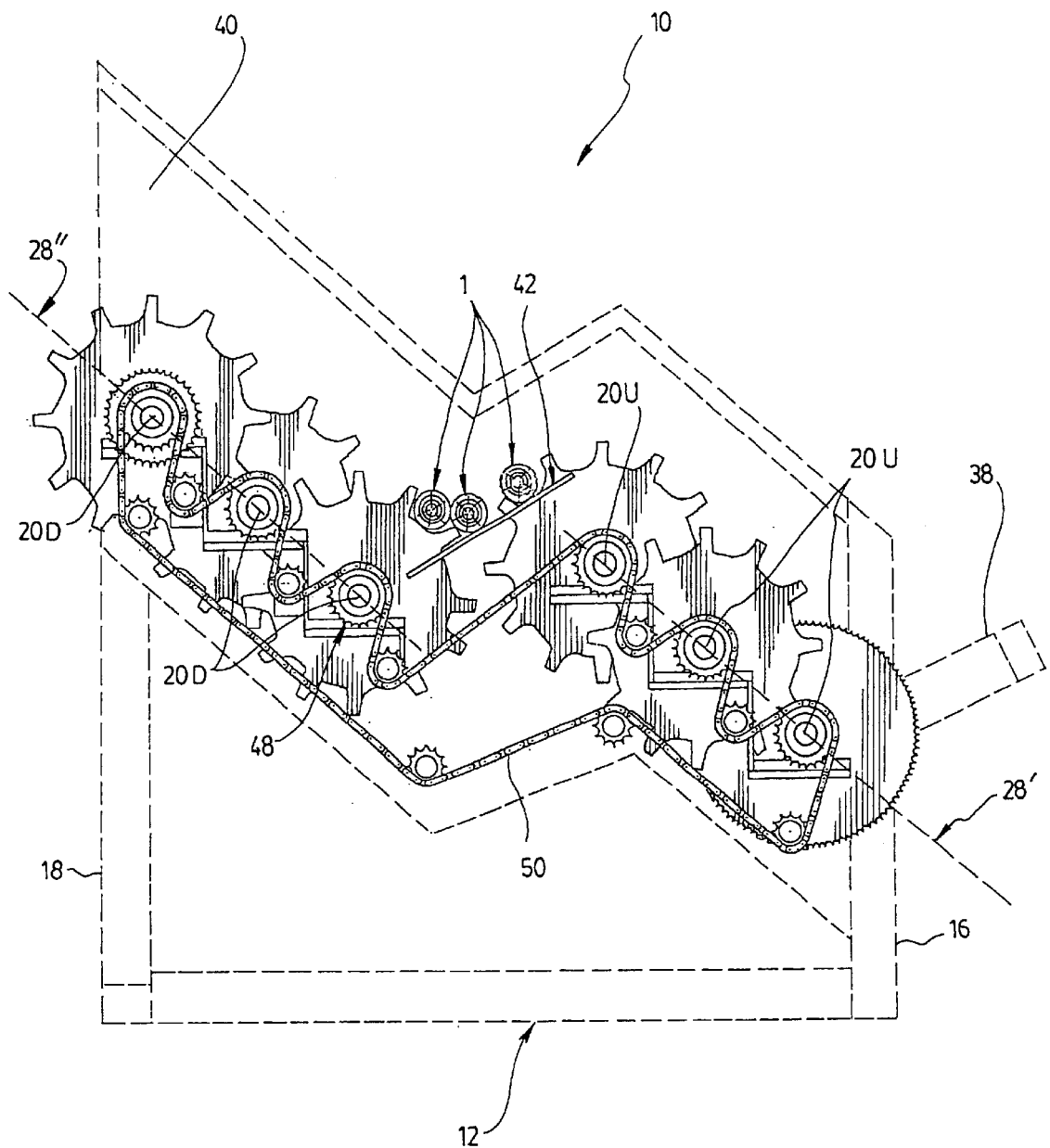
FIG. 5 is a side view of a third preferred embodiment of the invention.

According to a third preferred embodiment of the invention shown in FIG. 5, the conveying shafts are separated into two distinct groups where one is upstream and the other is downstream. This third preferred embodiment is specific to a machine (10) that conveys logs of wood (1). The upstream group comprises at least two upstream conveying shafts (20u) lying in a first plane (28'). The downstream group comprises at least two downstream conveying shafts (20d) lying in a second plane (28"). Preferably, both planes (28' and 28") are inclined with respect to the horizontal and parallel to each other, and the second plane (28") is spaced from the first plane (28') so that the logs of wood (1) are conveyed upwardly by the upstream conveying shafts (20u), and then are dropped onto the downstream conveying shafts (20d) which convey these dropped logs (1) upwardly. Advantageously, the additional shaft (30) is aligned with the plane (28') of the upstream conveying shaft (20u).

Still referring to FIG. 5, the machine (10) preferably comprises a log receiving area (42) between the upstream conveying shafts (20u) and the downstream conveying shafts (20d) for receiving and holding the logs (1) conveyed by the upstream conveying shafts (20u) prior to the logs (1) being conveyed by the downstream shafts (20d). Depending on the relative position of the downstream shafts (20d), the upstream shafts (20u) and their relative speed of rotation, the log receiving area (42) may be optional. Advantageously, the log receiving area (42) is a plate as illustrated in FIG. 5.

Preferably, the downstream conveying shafts (20d) are driven in rotation at a speed higher than the speed of rotation of the upstream conveying shafts (20u). This is a preferred feature since it avoids (or prevents) conveying two logs (1) at the same time. In such a case, the logs (1) conveyed two by two by the upstream conveying shafts (20u) are dropped on the log receiving area (42). Then, the downstream conveying shafts (20d) which rotates at a higher speed, picks up the log (1) on the area (42) one by one so that the logs (1) will not accumulate on the area (42). Moreover, this preferred feature allows the machine (10) to convey the logs (1) at a higher rate.

In practice, the upstream conveying shafts (20u) are preferably driven in rotation at a speed of 55.25 RPM and the downstream conveying shafts (20d) are preferably driven in rotation at a speed of 56.00 RPM. The differential speed given to the shafts (20u and 20d) can be caused by different mechanisms such as the variation of the diameter of the pinion (48) engaging the driving chain (50) (shown in FIGS. 2 and 5), or having a separate chain and pinion system for each group of conveying shafts (20u and 20d), or any other appropriate means.

Referring to FIG. 2, the machine (10) according to a preferred embodiment of the invention, also comprises a tray (44) that overlies the conveying shafts (20), and the additional shaft (30) if there is one. The tray (44) has slots (46) therein for receiving the toothed plates (24), and the notched plates (34) as the case may be, so that these plates (24 and 34) project upwardly through the slots (46). The tray (44) is advantageously used to prevent a maximum of wood residues from falling onto the mechanism of the machine (10).

Figure 9:
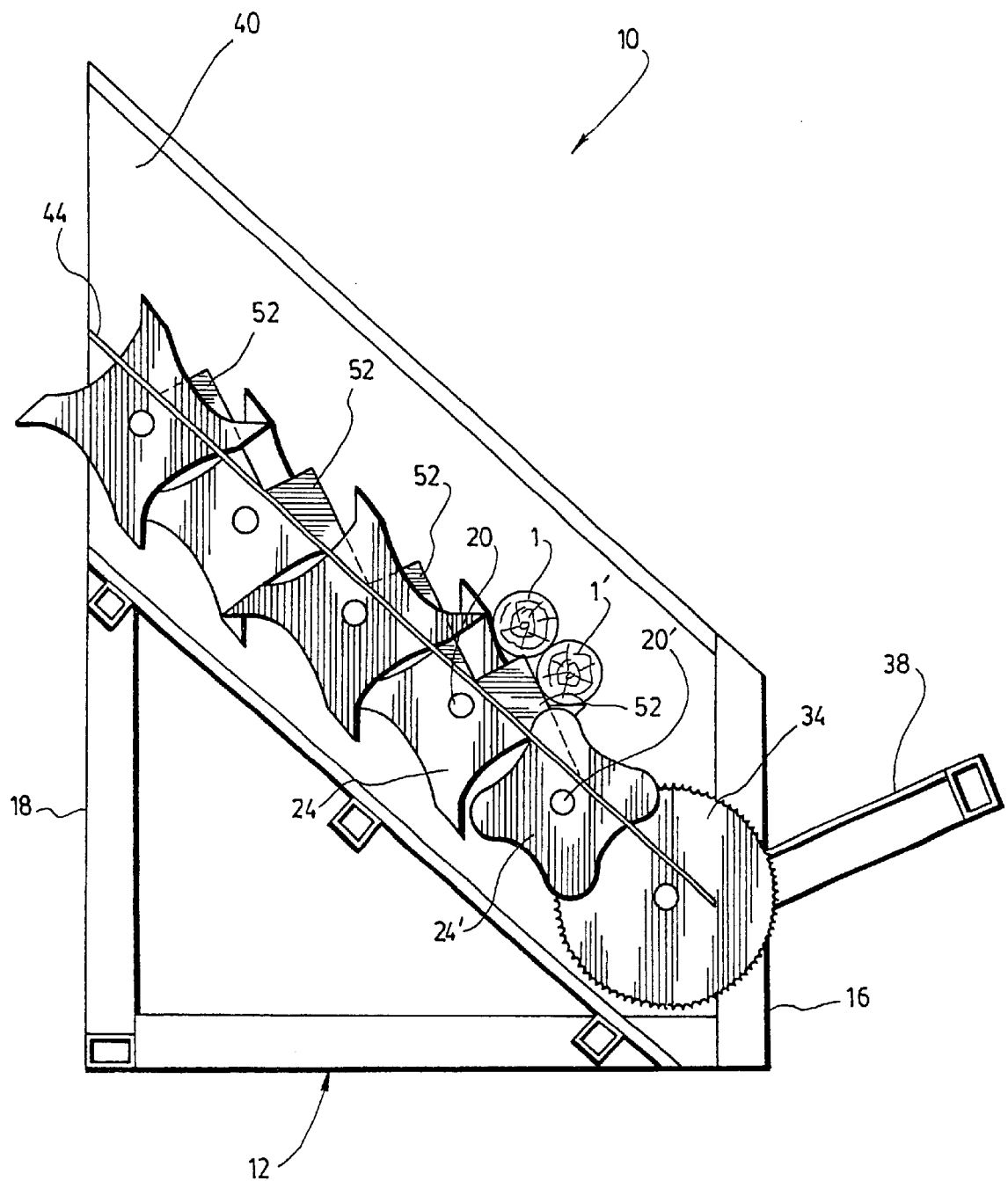
FIG. 9 is a cross-sectional view of a sixth preferred embodiment of the invention.

According to a sixth preferred embodiment of the invention shown in FIG. 9, the machine (10) further comprises a plurality of obstructing members (52), mounted on the tray (44) and protruding between the plates (24) of two adjacent conveying shafts (20) in order to block an additional log of wood (1') transferred together with a first log of wood (1) from the plates (24') of a conveying shaft (20') to the plates (24) of an adjacent downstream conveying shaft (20) from being conveyed with the first log of wood (1). The use of the obstructing members (52) on the machine (10) is specific to a machine (10) designed to convey logs of wood (10) and is a way to reduce the possibility of carrying two logs (1 and 1') at the same time, as will be detailed herein below.

Figure 10A:
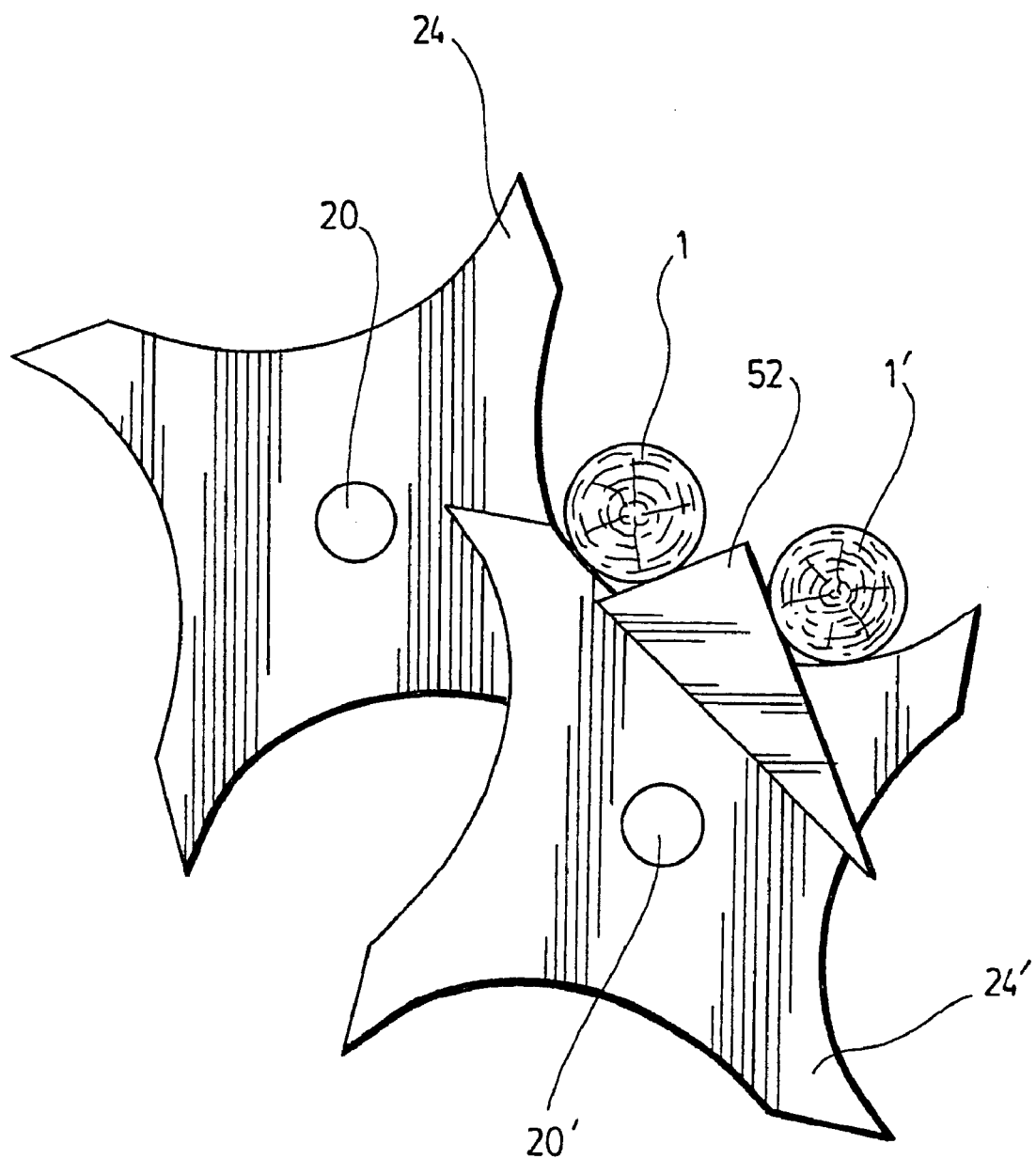
FIGS. 10A, 10B and 10C are temporal sequences of a portion of the view shown in FIG. 9 showing the interaction of the obstructing member with two logs being carried at the same time.
Figure 10B:
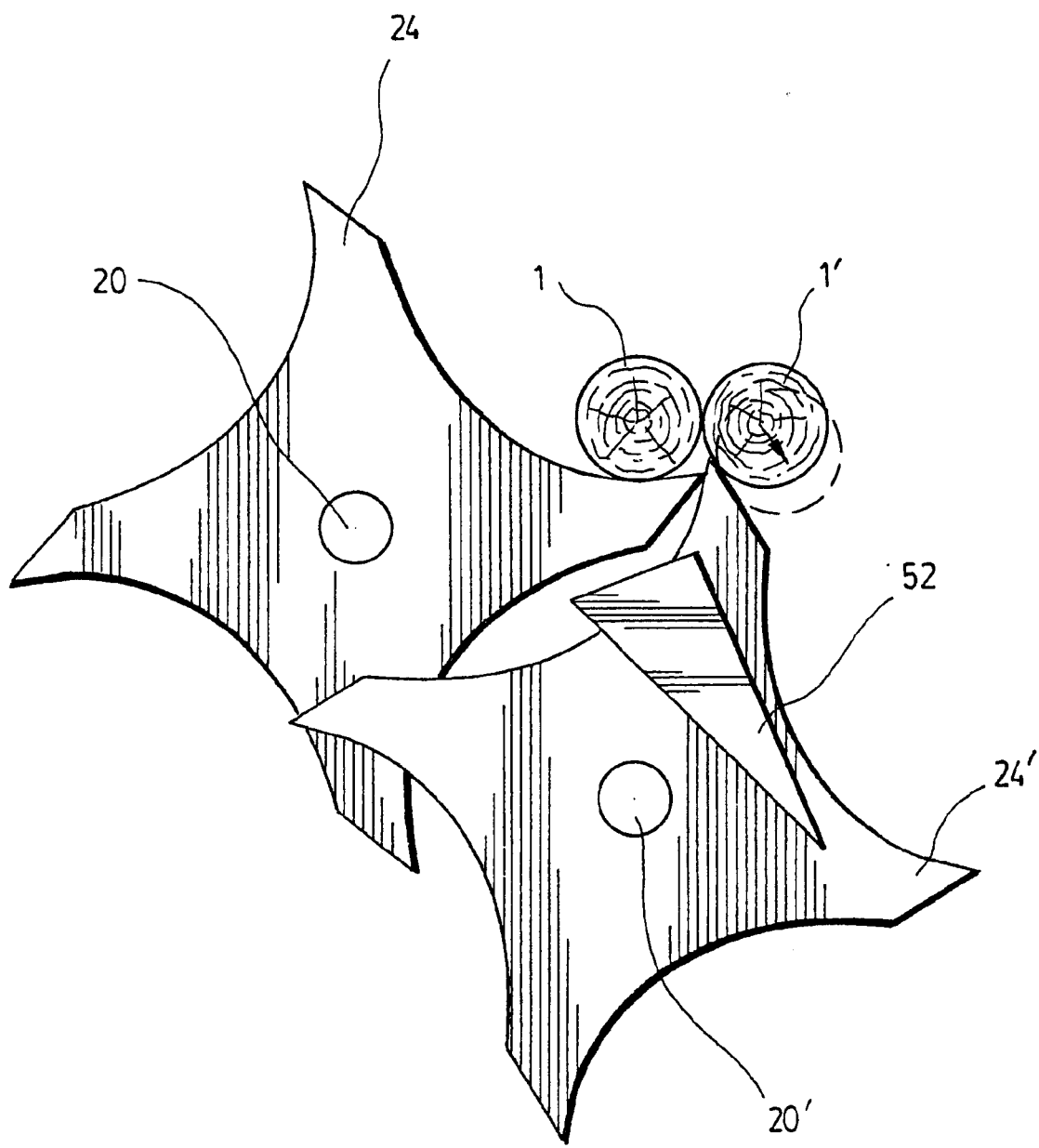
Figure 10:
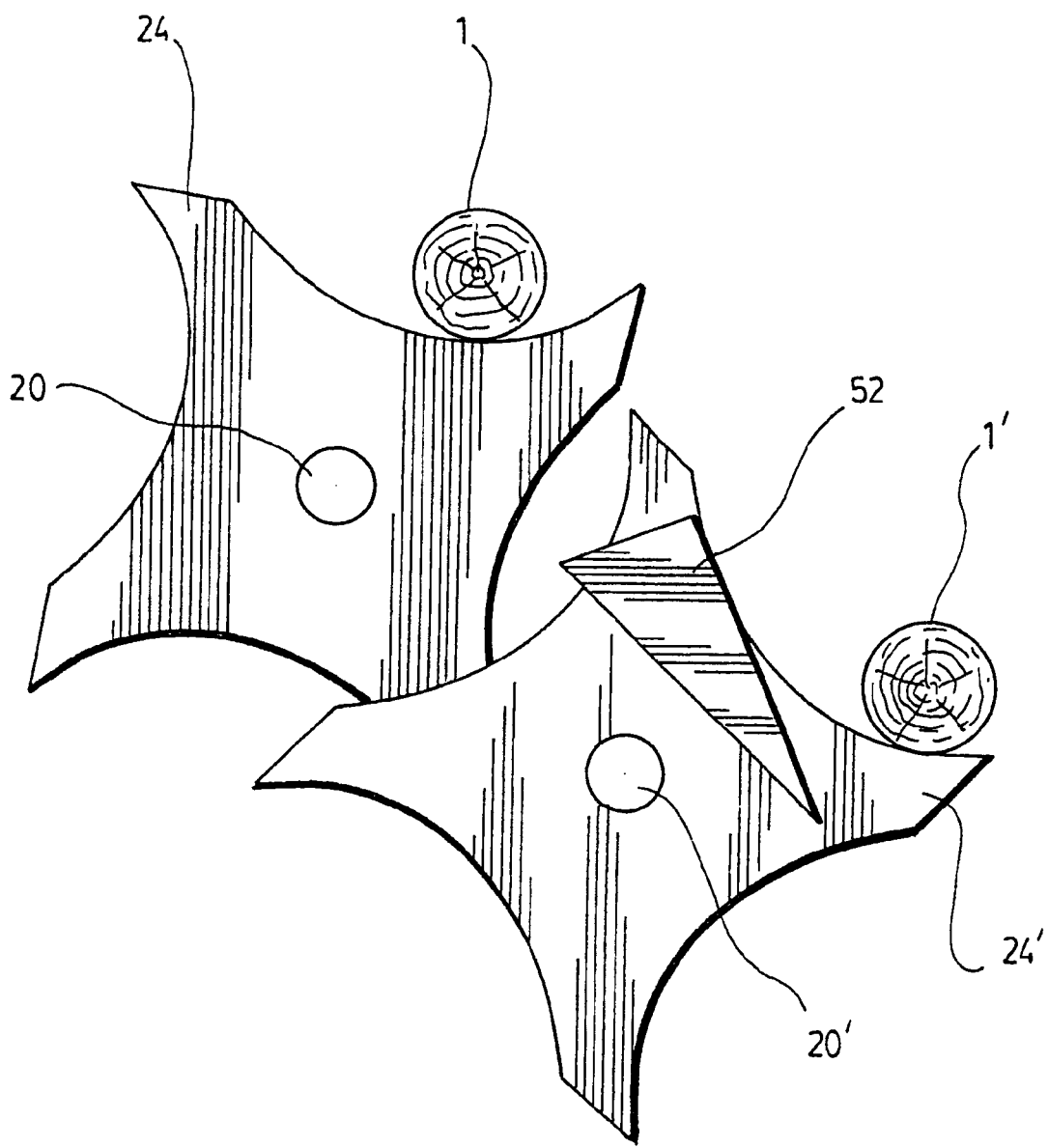
Figure 11:
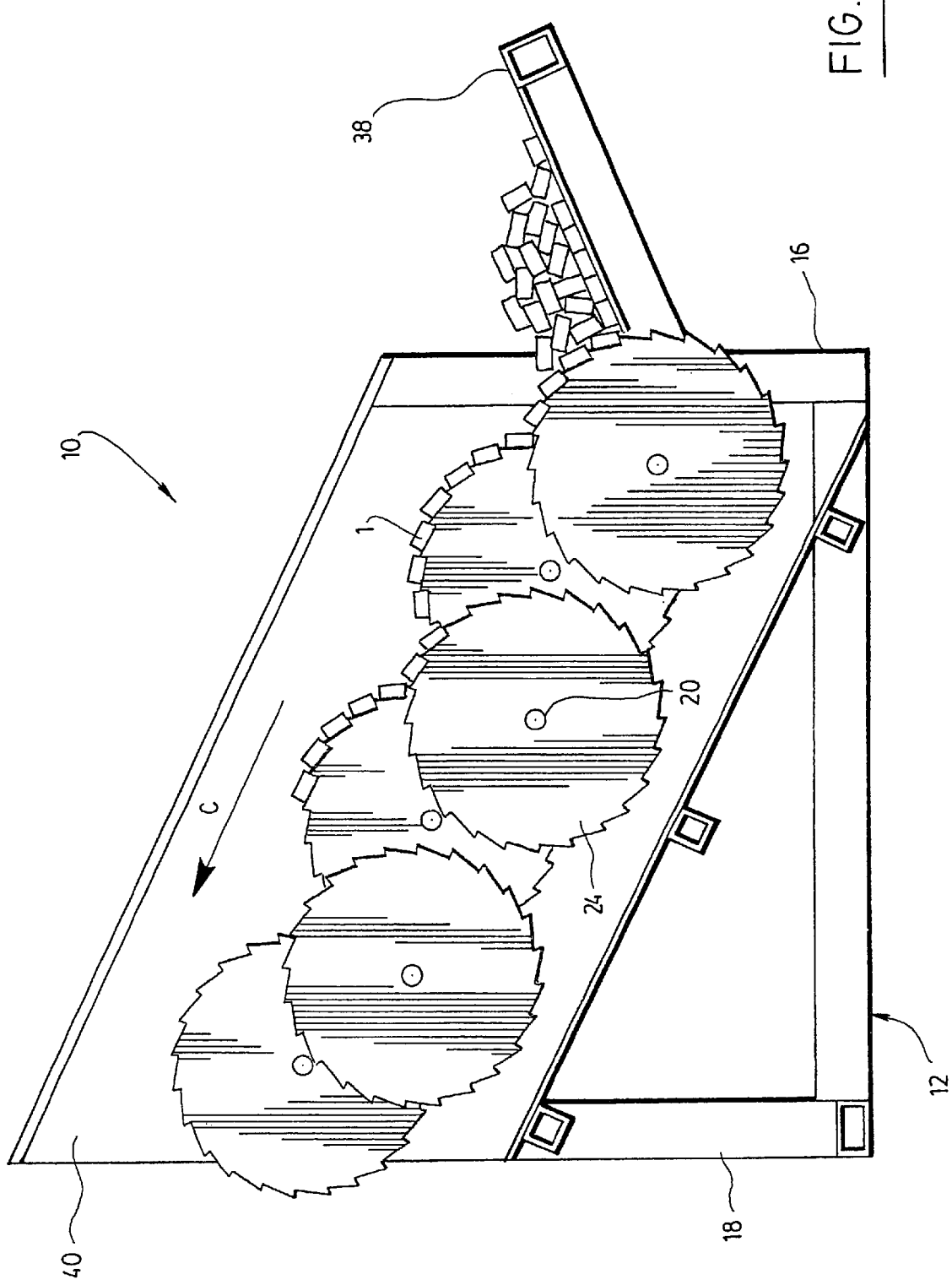
FIG. 11 is a cross-sectional view of a seventh preferred embodiment of the invention.

FIGS. 10a, 10b and 10c illustrate the effect of the obstructing members (52). The obstructing members (52) have a given shape and a given location (such as shown in the FIGS.) between the plates (24 and 24') of two shafts (20 and 20') so that they take a certain room in the space defined by the tooth (26) of the plates (24) and the tooth (26') of the following plates (24') during the log transfer time, as shown in FIG. 10a. When two logs (1 and 1') are conveyed together, one log (1) goes over the obstructing members (52) and the second one (1') stays back and leans on the obstructing members (52) as shown in FIG. 10a. The obstructing members (52) keep the second log (1') back so that the tooth (26') of the upstream plates (24') will not engage the second log (1'), as shown in FIGS. 10b and 10c.

Figure 8E:
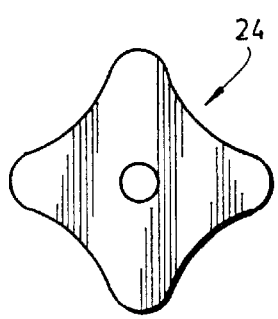
Figure 8F:
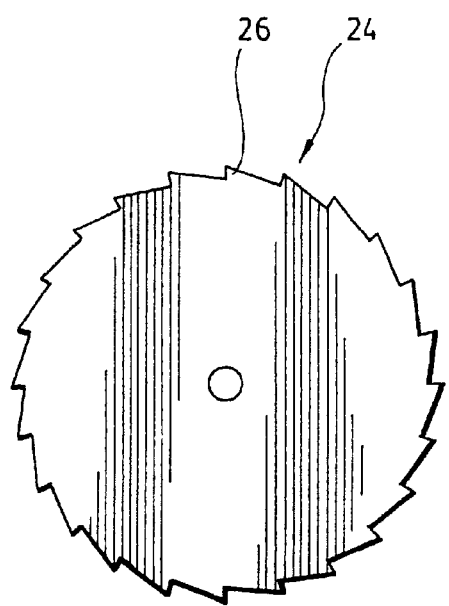
Figure 8G:
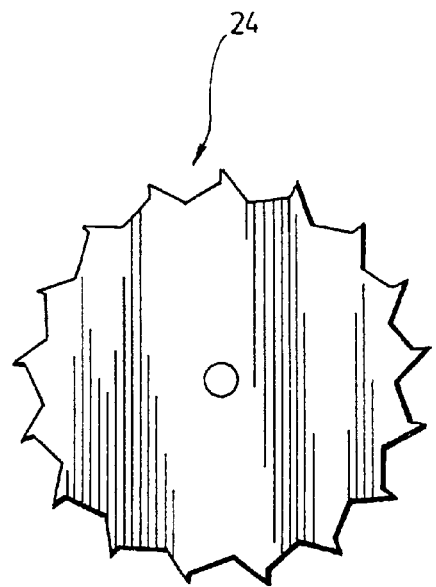

Referring again to FIG. 9, the shape of the conveying plates (24) of the machine (10) can vary from one shaft (20) to the other. One way to prevent that two logs (1 and 1') are carried at the same time, is to preferably mount conveying plates (24) of the shape shown in FIG. 8E on the most upstream conveying shaft (20'). Advantageously, the conveying plate (24) shown in FIG. 8E has round teeth (26) that can pick up a log of wood (1) and let a second log of wood (1') roll down the plate (24). Thus, using conveying plates (24) as shown in FIG. 8E on the most upstream shaft (20') can help to carry only one log (1) at the time. In the preferred embodiment shown in FIG. 9, the other conveying shaft (20) does not have plates (24) of the type of FIG. 8E.

Although preferred embodiments of the invention have been described in detail herein and illustrated in the accompanying drawings, it is to be understood that the invention is not limited to these preferred embodiments and that various changes and modifications could be made without departing from the scope or spirit of the invention as defined in the appended claims.

What is claimed is:

1. A machine for conveying elongated wooden pieces, each wooden piece having a width falling within a given range, the machine comprising:

a frame having two opposite sides, a front and a back, the wooden pieces being conveyed in a conveying direction from the front towards the back of the frame;

at least two parallel conveying shafts rotatably mounted on the frame, and being substantially perpendicular to the conveying direction, each shaft having an axis of rotation;

rotating means for rotating each shaft about said axis of rotation at a desired speed in a direction corresponding to the conveying direction;

at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the wooden pieces and defining a space therebetween for receiving at least a portion of a wooden piece, the teeth of the plates mounted on a same shaft being aligned;

a tray overlying the conveying shafts and having slots therein receiving the toothed plates so that said plates project upwardly through said slots; and a plurality of obstructing members mounted on the tray and protruding between the plates of two adjacent conveying shafts in order to block an additional wooden piece transferred together with a first wooden piece from the plates of a conveying shaft to the plates of an adjacent downstream conveying shaft from being conveyed with the first wooden piece;

wherein each shaft is spaced from an adjacent shaft by a distance at least equal to the radius of a toothed plate.

2. The machine of claim 1, wherein each plane in which extends respectively each toothed plate of the conveying shafts defines an angle with respect to the axis of rotation of each conveying shaft which is comprised between 75 and 90 degrees.

3. The machine of claim 1, further comprising a shelf on the front of the frame for receiving and holding the wooden pieces.

4. The machine of claim 3, further comprising side walls mounted on each opposite sides of the frame and extending upwardly, the side walls defining with the shelf a conveying area.

5. The machine of claim 1, wherein all the shafts lie in a plane which defines an angle with the horizontal being comprised between 0 and 50 degrees so that the back of the frame is equal or higher than the front of the frame and the conveying direction is oriented horizontally or upwardly.

6. The machine of claim 5, wherein the angle is 40 degrees.

7. A machine for conveying logs of wood, each log of wood having a width falling within a given range, the machine comprising:

a frame having two opposites sides, a front and a back, the logs being conveyed in a conveying direction from the front towards the back of the frame;

at least two parallel conveying shafts rotatably mounted on the frame, and being substantially perpendicular to the conveying direction, each shaft having an axis of rotation;

rotating means for rotating each shaft about said axis of rotation at a desired speed in a direction corresponding to the conveying direction;

at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the logs and defining a space therebetween for receiving at least a portion of a log, the teeth of the plates mounted on a same shaft being aligned;

a tray overlying the conveying shafts and having slots therein receiving the toothed plates so that said plates project upwardly through said slots; and a plurality of obstructing members mounted on the tray and protruding between the plates of two adjacent conveying shafts in order to block an additional log of wood transferred together with a first log of wood from the plates of a conveying shaft to the plates of an adjacent downstream conveying shaft from being conveyed with the first log of wood piece;

wherein each shaft is spaced from an adjacent shaft by a distance at least equal to the radius of a toothed plate.

8. The machine of claim 7, further comprising:

an additional shaft being rotatably mounted on the frame, and being located in an upstream position with respect to the at least two conveying shafts, said additional shaft having an axis of rotation parallel to the axis of rotation of the conveying shafts;

rotating means for rotating the additional shaft about its axis of rotation in a direction corresponding to the conveying direction; and at least two notched circular plates mounted on the additional shaft, each notched plate having a radius and a circumference being provided with a plurality of thin notches, each notched plate extending in a plane crossing the axis of rotation of the additional shaft, the notched plates being offset with respect to the toothed plates of a most upstream conveying shaft;

wherein the additional shaft is spaced from the most upstream conveying shaft by a distance at least equal to the longest one of the radius of a toothed plate and the radius of a notched plate.

9. The machine of claim 8, wherein each notched plate of said additional shaft has about 50 notches and a radius longer than the radius of each toothed plate of the conveying shafts.

10. The machine of claim 8, further comprising a shelf on the front of the frame for receiving and holding the logs.

11. A machine for conveying lumber, each lumber having a width falling within a given range, the machine comprising:

a frame having two opposite sides, a font and a back, the lumber being conveyed in an conveying direction from the front towards the back of the frame;

at least two parallel conveying shafts rotatably mounted on the frame, and being substantially perpendicular to the conveying direction, each shaft having an axis of rotation;

rotating means for rotating each shaft about said axis or rotation at a desired speed in a direction corresponding to the conveying direction;

at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the lumber and defining a space therebetween for receiving at least a portion of a lumber, the teeth of the plates mounted on a same shaft being aligned;

a tray overlying the conveying shafts and having slots therein receiving the toothed plates so that said plates project upwardly through said slots; and a plurality of obstructing members mounted on the tray and protruding between the plates of two adjacent conveying shafts in order to block an additional lumber transferred together with a first lumber from the plates of a conveying shaft to the plates of an adjacent downstream conveying shaft from being conveyed with the first lumber;

wherein each shaft is spaced from an adjacent shaft by a distance at least to the radius of a toothed plate.

12. A machine for conveying logs of wood, each log of wood having a width falling within a given range, the machine comprising;

a frame having two opposite sides, a front and a back, the lumber being conveyed in a conveying direction from the front towards the back of the frame;

a plurality parallel conveying shafts rotatably mounted on the frame, and being substantially perpendicular to the conveying direction, each shaft having an axis of rotation, said plurality of shafts comprising at least two upstream conveying shafts and at least two downstream conveying shafts, the upstream conveying shafts lying in a first plane inclined with respect the horizontal, the downstream conveying shafts lying in a second plane inclined with respect to the horizontal, the second plane being parallel and spaced from the first plane so that the logs are conveyed upwardly by the upstream conveying shafts, and are then dropped onto the downstream conveying shafts which convey said logs upwardly;

a log receiving area between the upstream conveying shafts and the downstream conveying shafts for receiving and holding the logs conveyed by the upstream conveying shafts prior to the logs being conveyed by the downstream shafts;

rotating means for rotating each shaft about said axis of rotation at a desired speed in a direction corresponding to the conveying direction; and at least two toothed circular plates mounted on each shaft, each plate having a radius and extending in a plane crossing the axis of rotation of the shafts, the plates of a shaft being offset with respect to the plates of an adjacent shaft, each tooth of each plate being spaced apart from an adjacent tooth by a distance which corresponds substantially to the range of diameter of the log of wood and defining a space therebetween for receiving at least a portion of a log of wood, the teeth of the plates mounted on a same shaft being aligned;

wherein each shaft is spaced from an adjacent shaft by a distance at least equal to the radius of a toothed plate; and wherein the downstream conveying shafts are driven in rotation at a speed higher than a given speed of rotation of the upstream conveying shafts.

13. The machine of claim 12, wherein the upstream conveying shafts are driven in rotation at a speed of 55.25 RPM and the downstream conveying shafts are driven in rotation at a speed of 56.00 RPM.

* * * * *